(12) United States Patent
Han et al.

(10) Patent No.: US 6,507,744 B1
(45) Date of Patent: Jan. 14, 2003

(54) OUTER LOOP POWER CONTROL METHOD DURING A SOFT HANDOFF OPERATION

(75) Inventors: Jong Sun Han, Seoul (KR); Young Jo Lee, Seoul (KR)

(73) Assignee: LG Information & Communications, Ltd., Seoul (KR)

( * ) Notice: Subject to any disclaimer, the term of this patent is extended or adjusted under 35 U.S.C. 154(b) by 0 days.

(21) Appl. No.: 09/468,605

(22) Filed: Dec. 21, 1999

(30) Foreign Application Priority Data

Dec. 29, 1998 (KR) .............................. 98-60399

(51) Int. Cl.$^7$ ................................ H04Q 7/20
(52) U.S. Cl. ...................... 455/522; 455/69; 455/442; 370/331; 370/335
(58) Field of Search .......................... 455/69, 522, 442; 370/331, 332, 333, 335, 342

(56) References Cited

U.S. PATENT DOCUMENTS 5,574,983 A * 11/1996 Douzono et al. ............. 455/69
6,144,861 A * 11/2000 Sundelin et al. ............. 455/69

* cited by examiner

*Primary Examiner*—Lee Nguyen
(74) *Attorney, Agent, or Firm*—Fleshner & Kim, LLP

(57) ABSTRACT

An outer loop power control method for a mobile communication system is disclosed. By implementing two outer loop power control methods, one for a normal mode and the other for a soft handoff mode, the outer loop power control in the present invention variably adjusts the ratio of up/down step size for a power control threshold value during a soft handoff operation.

11 Claims, 2 Drawing Sheets

OUTER LOOP POWER CONTROL METHOD DURING A SOFT HANDOFF OPERATION

BACKGROUND OF THE INVENTION

1. Field of the Invention

The present invention relates to a code division multiple access (CDMA) mobile wireless communication system, and more particularly to a power control for the CDMA communication system.

2. Description of the Related Art

In a mobile wireless communication system, a handoff operation must be performed when a base station moves from one region to another. During a soft handoff operation, a selector in a base station controller (BSC) generally performs an outer loop power control of the base stations belonging in an active set. FIG. 1 shows a portion of a typical mobile wireless communication system.

Referring to FIG. 1, each base station 20–40 receive a signal from a mobile station (MS) and performs a cyclic redundancy check (CRC) on the received frame. The base stations 20–40 report the result of the CRC to a selector 12 of a BSC 10. Utilizing the present CRC results and previous target frame error rates determined based upon a history of CRC results, the selector 12 adjusts power control threshold values of the base stations 20–43 so that each BS can independently maintain a target frame error rate.

A power control threshold value is adjusted in steps by a range of ratio K. Whether the power control threshold values are adjusted up or down is determined by a predetermined target frame error rate F. For example, in order for the selector 12 to maintain a target frame error rate of 1%, the ratio K of the down step for lowering the power control threshold value is determined to be K=(1/F)−1, i.e. K=(1/0.01)−1=99. Thereafter, a corresponding inner loop power control threshold value is determined.

In the outer loop power control method as described above, the ratio of the up/down step size to adjust the power control threshold value is determined in the same manner regardless of the state in which a mobile station may be in. In other words, the value of the ratio is determined identically during a soft handoff and when a soft handoff is not being performed.

If a frame error ratio of the base station in the soft handoff active set increases during a soft handoff, the selector 12 executes a selection combining operation, to meet the target frame error rate. However, if the ratio of the up/down step is adjusted during a soft handoff in the same manner as when a soft handoff is not being performed, the power control threshold may abruptly increase. This causes a mobile station to transmit a signal using more power than necessary, resulting in the decrease of the whole capacity for users of the communication system.

As a result, if the ratio of the up/down step size is identically adjusted during a soft handoff and when a soft handoff is not being performed, the base stations cannot perform an accurate power control with respect to the mobile station.

SUMMARY OF THE INVENTION

Accordingly, an object of the present invention is to solve at least the problems and disadvantages of the related art.

An object of the present invention is to provide a more effective cellular communication system.

Another object of the present invention is to provide a more effective outer loop power control method for a cellular communication system.

A further object of the present invention is to provide an outer loop power control method which can variably adjust the ratio of an up/down step size for a power control threshold value of base stations.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, the outer loop power control method includes performing an outer loop power control in a normal mode according to a fixed target frame error rate and determining a corresponding inner loop power control threshold value; and performing a soft handoff mode by determining a target frame error rate according to the number of base stations which belong to a soft handoff active set and by determining a corresponding ratio of up/down step size to an outer loop power control threshold value.

In the outer loop power control method, an outer loop power control is performed independently during a soft handoff, with respect to the base stations in the active set. Also, in the outer loop power control method, a plurality of base stations which belong to a soft handoff active set check errors of received frames depending on whether when a soft handoff from a mobile station is initiated. The base station which belong to the soft handoff active set then determines a target frame error rate according to a result of the checked frame error, checked previous frame error, and the number of base stations which belong to the active set. Finally, the base stations each determine a ratio of an up/down step size for the power control threshold value according to the determined target frame error rate.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Figure 2:
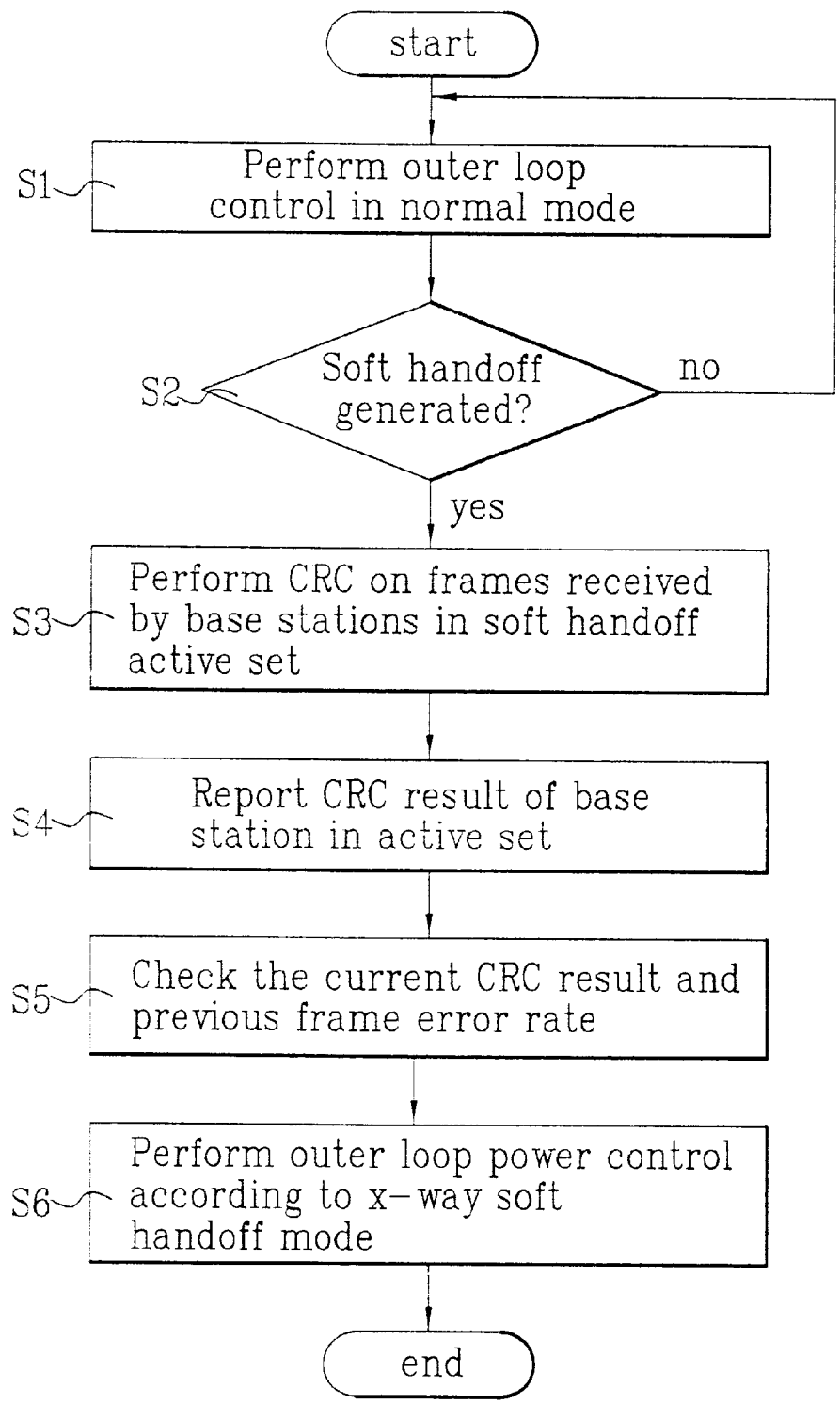
FIG. 2 is a flowchart illustrating an outer loop power control method according to the present invention.

Reference will now be made in detail to the preferred embodiment of the present invention, examples of which are illustrated in the accompanying drawings. Generally, an outer loop power control performed by the present invention may be divided into an outer loop power control in a normal mode and an outer loop power control in a soft handoff mode. The outer loop power control in the soft handoff mode is performed based upon the number of base stations which belong to a soft handoff active set. FIG. 2 shows a flowchart of the outer loop power control method according to the present invention.

Figure 1:
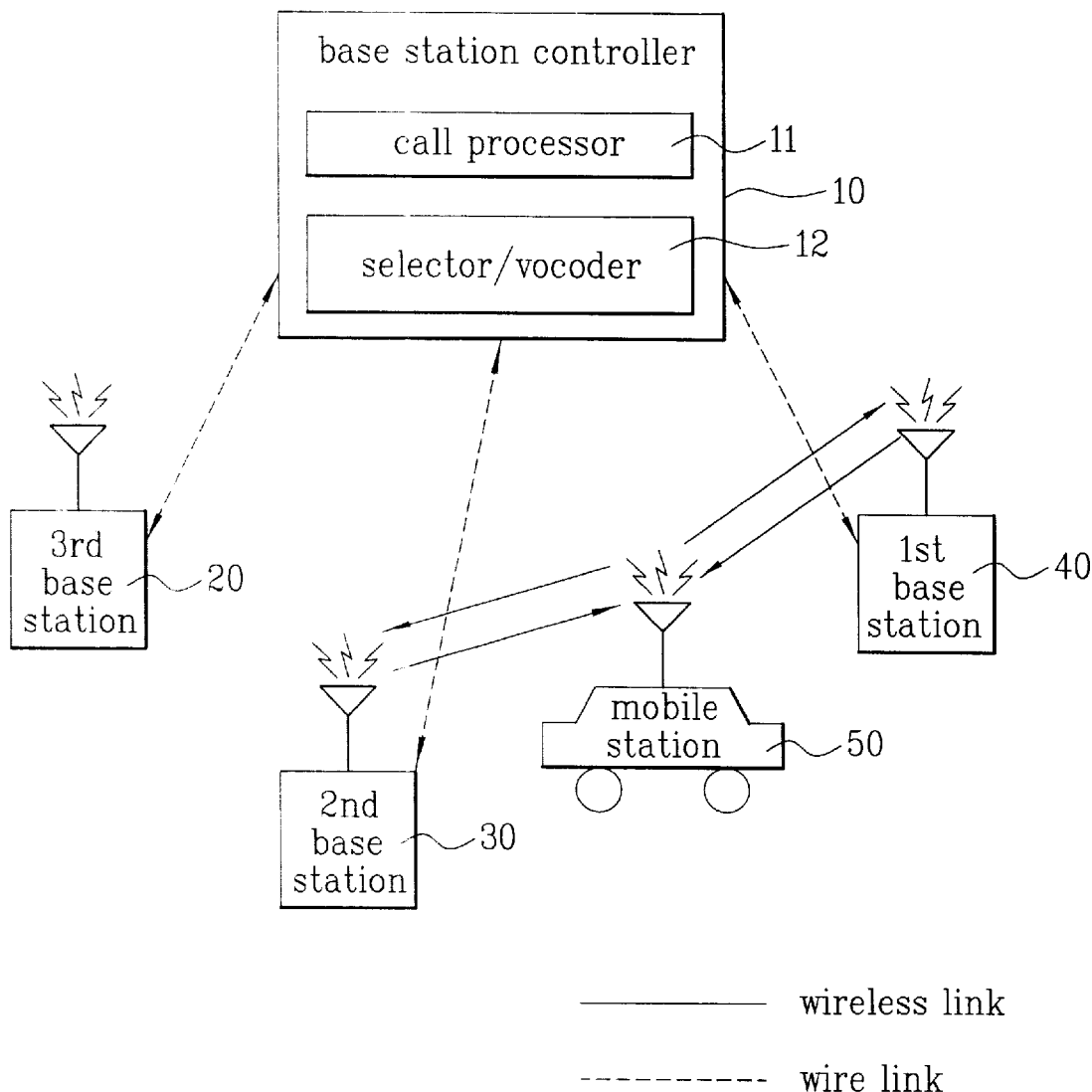
FIG. 1 is a portion of a typical mobile radio communication system.

Referring to FIG. 2, during a normal mode when a soft handoff is not being executed (step S1), an outer loop power control as performed in the same manner as the conventional outer loop power control described with reference to FIG. 1 above. Namely, the ratio of the up/down step size K is determined to be K=(1/F)−1 where F is the predetermined target frame error rate.

However, in the soft handoff mode when a softhand handoff is being executed, the selector of the BSC adjusts the ratio of the up/down step size for adjusting the power control threshold value in a different manner from the normal mode. The selector then transmits the adjusted power control threshold values to the respective base stations in the active set in units of a frame. Thus, the outer loop power control is performed in two states, and the ratio of the up/down step size is adjusted differently depending upon whether the outer loop power control is for the normal mode or for the soft handoff mode.

Also, the soft handoff mode is classified according to the number of base stations included in the soft handoff active set. For example, if the number of base stations included in the active set is 2, 3, or X, the outer loop power control is respectively performed in a 2-way soft handoff mode, 3-way soft handoff mode or X-way soft handoff mode. Essentially, the ratio of the down step size is adjusted according to the number of base stations which belong to the active set and the predetermined target frame error rates of such base stations. Generally, as the number of the base stations belonging to the active set increases, the ratio of the up/down step size to the power control threshold value decreases.

Referring back to FIG. 2, if a soft handoff is initiated from a mobile station while the outer loop power control is performed in the normal mode (step S2), the base stations included in the soft handoff active set perform the CRC with respect to a frame received from the mobile station (step S3). Accordingly, when base stations in the active set report the CRC results to the selector of the BSC (step S4), the selector adjusts the power control threshold values of such base stations independently based upon variable target frame error rates. The selector also checks the current CRC report and the previous target frame error rates corresponding to past CFRC result history.

Particularly, to adjusts the power control threshold values, the selector determines the ratio K based upon the predetermined target frame error as well as the number of base stations X in the active set. Thus, the selector detects the number of base stations X in the active set. The selector then determines the variable target frame error rate B of each base station in the active set by calculating the Xth root of A. Finally, the ratio K of the up/down step size during the soft handoff mode is calculated using the modified target frame error rate B, i.e. $K=(1/B)-1$. The selector thus performs the outer loop power control using the power control threshold values independently adjusted by the X-way soft handoff mode as determined by the X number of the base stations in the active set (step S6).

For example, if there are two base stations in the active set, the ratio of the up/down step size for the power control threshold value during a soft handoff is determined by the 2-way soft handoff mode. Assuming the selector of the BSC performs the selection combining operation during the soft handoff to meet a predetermined target frame error rate of 1%, A=0.01 and X=2 since there are two base stations in the active set. Accordingly, the modified target frame error rate B would be $\sqrt{(0.01)}=0.1=10\%$. By applying the modified target frame error rate to K $(1/B)-1$, a value of $K=(1/0.1)-1=9$ is obtained.

If another base station is added to the active set while the 2-way soft handoff is being performed, the ratio of the up/down step size to the power control threshold value is determined by the 3-way soft handoff mode. In the 3-way soft handoff mode, X=3 and the variable target frame error rate B may be caluculated by taking the cubic root of F. Thus, assuming F is still equal to 0.01, the modified target frame error rate B would be 0.215 or 21.5% and the ratio of the value of $K=(1/0.215)-1\cong3.65$.

As described above, the ratio of the up/down step size for the outer loop power control threshold value is variably adjusted according to the number of the base stations which belong to the active set when the soft handoff of the mobile station is performed. As a result, unnecessary power consumption can be minimized, allowing a good speech quality without the necessity of additional software or separate message transmission/reception. Therefore, the outer loop power control according to the present invention can increase the whole capacity for the system users.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An outer loop power control method comprising:
   determining whether a soft handoff is being executed;
   performing a normal mode outer loop power control according to a predetermined target frame error rate A if the soft handoff is not being executed; and
   performing a soft handoff mode outer loop power control according to a variable target frame error rate B that is based on a number of base stations in an active set, wherein determining the variable target frame error rate B based upon the predetermined target frame error rate A and based upon the number of base stations X belonging in the active set, and wherein the variable target frame error rate B is calculated by taking the X root of the predetermined target frame error rate A.

2. A method of claim 1, wherein performing the normal outer mode loop control by determining a ratio of an up/down step size K1 and adjusting a power control threshold value in steps of the ratio K1, wherein $K1=(1/A)-1$.

3. A method of claim 1, wherein performing the soft handoff mode outer loop control by determining a ratio of an up/down step size K2 and adjusting a power control threshold value in steps of the ratio K2, wherein $K2=(1/B)-1$.

4. A method of claim 3, wherein the soft handoff mode outer loop power control is performed independently for each base station of an active set.

5. A method of claim 1, wherein the performing a soft handoff mode outer loop power control controls a transmission power of a mobile station.

6. An outer loop power control method during a soft handoff comprising:
   performing a CRC on a frame received by each base station in an active set;
   reporting the CRC results to a base station controller;
   determining a target frame error rate B of each base station based upon a number of base stations in the active set and based upon a predetermined target frame error rate A; and
   performing the outer loop power control according to the target frame error rate B, wherein determining the target frame error rate B is calculated by taking the X root of the predetermined target frame error rate A.

7. A method of claim 6, wherein performing the outer loop control by determining a ratio of an up/down step size K and adjusting a power control threshold value in steps of the ratio K, wherein $K=(1/B)-1$.

8. A method of claim 7, wherein the outer loop power control is performed independently for each base station of the active set.

9. An outer loop power control method comprising:

determining whether a soft handoff is being executed;

performing a normal mode outer loop power control according to a predetermined target frame error rate A if the soft handoff is not being executed; and performing a soft handoff mode outer loop power control according to a variable target frame error rate B if the soft handoff is being executed, wherein said variable target frame error rate B is based upon a number of base stations X belonging in the active set, wherein performing the normal outer mode loop control by determining a ratio K1 by an equation K1=(1/A)−1 and adjusting a power control threshold value in steps of the ratio K1, and wherein the variable target frame error rate B is calculated by taking the X root of the predetermined target frame error rate A.

10. A method of claim 9, wherein performing the soft handoff mode outer loop control by determining a ratio K2 by an equation K2=(1/B)−1 and adjusting a power control threshold value in steps of the ratio K2.

11. A method of claim 10, wherein the soft handoff mode outer loop power control is performed independently for each base station of the active set.

* * * * *